(12) United States Patent
Park et al.

(10) Patent No.: US 8,583,873 B2
(45) Date of Patent: Nov. 12, 2013

(54) MULTIPORT DATA CACHE APPARATUS AND METHOD OF CONTROLLING THE SAME

(75) Inventors: Jae-Un Park, Seoul (KR); Ki-Seok Kwon, Seoul (KR); Suk-Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 13/036,102

(22) Filed: Feb. 28, 2011

(65) Prior Publication Data

US 2011/0225369 A1 Sep. 15, 2011

(30) Foreign Application Priority Data

Mar. 10, 2010 (KR) .................. 10-2010-0021410

(51) Int. Cl.
*G06F 12/00* (2006.01)
*G06F 13/00* (2006.01)
(52) U.S. Cl.
USPC .................. 711/131; 711/5; 711/E12.023
(58) Field of Classification Search
None
See application file for complete search history.

(56) References Cited

U.S. PATENT DOCUMENTS

| | | | |
|---|---|---|---|
| 5,247,649 A | 9/1993 | Bandoh | |
| 5,265,233 A * | 11/1993 | Frailong et al. | 711/118 |
| 5,752,260 A | 5/1998 | Liu | |
| 5,924,117 A | 7/1999 | Luick | |
| 5,987,570 A * | 11/1999 | Hayes et al. | 711/140 |
| 6,101,589 A * | 8/2000 | Fuhrmann et al. | 711/127 |
| 6,223,248 B1 * | 4/2001 | Bosshart | 711/165 |
| 6,240,487 B1 * | 5/2001 | Liu et al. | 711/127 |
| 6,490,652 B1 * | 12/2002 | Van Hook et al. | 711/118 |
| 6,988,167 B2 | 1/2006 | Allen et al. | |
| 7,526,612 B2 | 4/2009 | Nakazato | |
| 7,836,253 B2 | 11/2010 | Chiba et al. | |
| 8,001,334 B2 * | 8/2011 | Lee | 711/149 |
| 2004/0088489 A1 * | 5/2004 | Hironaka et al. | 711/131 |
| 2005/0240733 A1 * | 10/2005 | Luick | 711/137 |
| 2006/0101207 A1 * | 5/2006 | Nakazato | 711/131 |
| 2008/0036764 A1 * | 2/2008 | Chung et al. | 345/422 |
| 2008/0276046 A1 | 11/2008 | Moerman et al. | |

FOREIGN PATENT DOCUMENTS

| | | |
|---|---|---|
| EP | 0 881 575 | 12/1998 |
| JP | 08-036525 | 2/1996 |
| JP | 2006-139401 | 6/2006 |
| JP | 2008-542945 | 11/2008 |
| KR | 10-1989-0017615 | 12/1989 |
| KR | 10-1997-0071283 | 11/1997 |
| KR | 10-1998-063475 | 10/1998 |
| KR | 10-1999-0071554 | 9/1999 |
| KR | 10-1999-0082423 | 11/1999 |
| KR | 10-2008-0036940 | 4/2008 |
| WO | WO 98/13763 | 4/1998 |

* cited by examiner

*Primary Examiner* — Matthew Bradley
*Assistant Examiner* — Daniel Bernard
(74) *Attorney, Agent, or Firm* — NSIP Law (57) ABSTRACT

A multiport data cache apparatus and a method of controlling the same are provided. The multiport data cache apparatus includes a plurality of cache banks configured to share a cache line, and a data cache controller configured to receive cache requests for the cache banks, each of which including a cache bank identifier, transfer the received cache requests to the respective cache banks according to the cache bank identifiers, and process the cache requests independently from one another.

14 Claims, 11 Drawing Sheets

| Tag | Index | Block Offset | Bank ID |
|---|---|---|---|
| 601 | 602 | 603 | 604 |

MULTIPORT DATA CACHE APPARATUS AND METHOD OF CONTROLLING THE SAME

CROSS-REFERENCE TO RELATED APPLICATION(S)

This application claims the benefit under 35 U.S.C. §119 (a) of Korean Patent Application No. 10-2010-0021410, filed on Mar. 10, 2010, in the Korean Intellectual Property Office, the entire disclosure of which is incorporated herein by reference for all purposes.

BACKGROUND

1. Field

The following description relates to system architecture to process a plurality of operations simultaneously, and a technique to speed up the process of an application run on the system architecture.

2. Description of the Related Art

For fast data processing speed in an embedded system, scratch pad memory (SPM) is generally used. SPM is controlled by a direct memory access controller (DMAC) as a layer 1 (L1) memory between a central processing unit (CPU) and an external memory.

An embedded system utilizing SPM loads certain data to the SPM from the external memory prior to running an application. Thus, if a substantial amount of data is required for running an application, SPM of a large capacity is prepared and all necessary data should be loaded on the SPM in advance.

However, since the SPM is limited in its capacity, data that is not present in the SPM needs to be loaded to the SPM through the DMAC in the course of running the application. The movement of data through the DMAC in the course of running the application is additionally taken into consideration by programmers, and thus it may complicate programming.

SUMMARY

In one general aspect, there is provided a multiport data cache apparatus including a plurality of cache banks configured to share a cache line, and a data cache controller configured to receive cache requests for the cache banks, each of which including a cache bank identifier, transfer the received cache requests to the respective cache banks according to the cache bank identifiers, and process the cache requests independently from one another.

The data cache controller may be further configured to, read a data set corresponding to a cache request which results in a cache miss from an external memory, and write the read data set to the cache banks in an interleaved manner, in response to the cache miss occurring.

The data cache controller may be further configured to receive at least two cache requests having different cache bank identifiers, and to prioritize the cache requests, and is sequentially process the cache requests according to the priority, in response to cache misses occurring in more than one of the cache banks identified in the at least two cache requests.

The data cache controller may be further configured to queue remaining received cache requests until at least one of the at least two cache requests is processed according to priority.

The data cache controller may be further configured to receive the cache requests from a plurality of processing elements, and to provide data from cache banks upon which a cache hit occurs to the processing elements.

The data cache controller may be further configured to prioritize the cache requests, and sequentially process the cache requests according to priority, in response to at least two of the cache requests including the same cache bank identifier.

The data cache controller may be further configured to transfer one of the cache requests having the same cache bank identifier to the cache bank according to the priority, and queue remaining cache requests until the transferred cache request is processed.

The multiport data cache apparatus may further comprise a plurality of processing elements configured to simultaneously access the same cache line.

In another general aspect, there is provided a multiport data cache control method including receiving cache requests for individual cache banks, each including a cache bank identifier, transferring the received cache requests to the respective cache banks according to the cache bank identifiers, and processing the cache requests for the respective cache banks independently from one another.

The transferring of the cache requests may include prioritizing the received cache requests, and sequentially transferring the cache requests according to the priority, in response to at least two of the cache requests including the same cache bank identifier.

The transferring of the cache requests may include transferring one of the cache requests is having the same cache bank identifier according to the priority, and queuing the remaining cache requests until the transferred cache requests is processed.

The processing of the cache requests my include reading a data set corresponding to a cache request which results in a cache miss from an external memory, and writing the read data set to the cache banks in an interleaved manner, in response to the cache miss occurring.

The processing of the cache request may include prioritizing the cache requests, and sequentially processing the cache requests according to the priority, in response to cache misses occurring in more than one of the cache banks identified in at least two cache requests.

The processing of the cache requests may include queuing remaining received cache requests until at least one of the at least two cache requests is processed according to the priority.

The cache requests may be received from a processing element and the processing of the cache requests may include providing data from cache banks upon which a cache hit occurs to the processing element.

The cache bands may share a cache line.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of is well-known functions and constructions may be omitted for increased clarity and conciseness.

Figure 1:
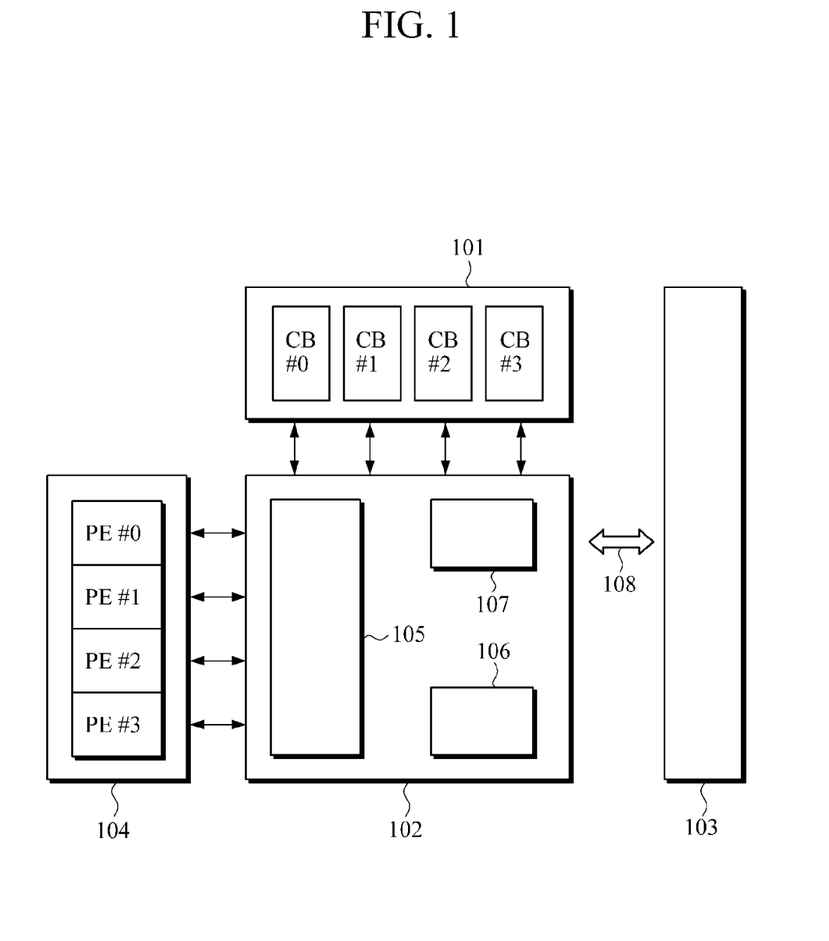
FIG. 1 is a diagram illustrating an example of a multiport data cache apparatus.

FIG. 1 illustrates an example of a multiport data cache apparatus. Referring to the example illustrated in FIG. 1, the multiport data cache apparatus may include a data cache 101 and a data cache controller 102. In addition, the multiport data cache apparatus may further include an external memory 103 and a processing core 104. Although, the data cache 101, data cache controller 102, external memory 103, and processing core 104 are illustrated as separate devices in FIG. 1, it is understood that two or more of these devices may be combined as one device, on a common chip set, on a single chip, etc.

The data cache 101 may store data read from the external memory 103. The external memory 103 may be a synchronous dynamic random access memory (SDRAM), a double data rate (DDR) RAM, or the like. A shorter time is needed for the processing core 104 to read data from the data cache 101 than from the external memory 103. Thus, if data frequently used by the processing core 104 is loaded on the data cache 101, the data processing efficiency may be increased.

The data cache 101 may be formed of a plurality of cache banks CB#0 to CB#3. Each cache bank CB#0 to CB#3 may occupy a particular portion of the data cache 101. Cache banks CB#0 to CB#3 may be distinguished from one another by specific addresses. The structure of the data cache 101 or each of the cache banks CB#0 to CB#3 may utilize direct-mapping, fully-associative mapping, k-way set associative mapping, or the like, and a cache line size may vary according to the purpose and application.

The processing core 104 may be provided with a plurality of processing elements PE#0 to PE#3.

The data cache controller 102 may receive a cache request from the processing core 104. For example, the data cache controller 102 may receive a cache request from one or more of each is of the processing elements PE#0 to PE#3. Each of the processing elements PE#0 to PE#3 may include an arithmetic logic unit and a load/store unit.

The cache request may be a request to read data from the data cache 101. In addition, the cache request may include a corresponding identifier of a respective one or more of each cache bank CB#0 to CB#3. Specifically, the cache request received by the data cache controller 102 may include information indicating from where the cache request is sent, and to where the cache request is to be sent.

Figure 6:
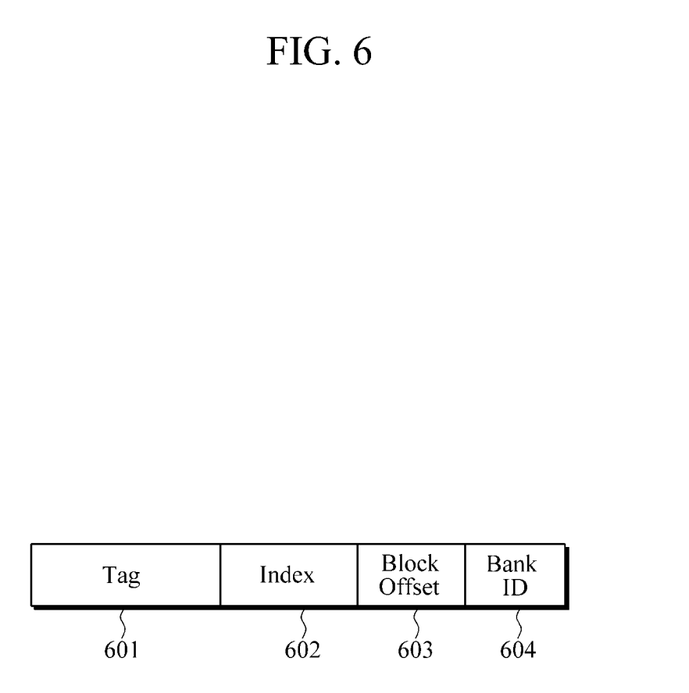
FIG. 6 is a diagram illustrating an example of a data address for access to a data cache.

FIG. 6 illustrates an example of a data address used to access a data cache. Referring to the example illustrated in FIG. 6, a cache request may include a cache address of 32 bits, including a tag 601, an index 602, a block offset 603, and a bank ID 604.

The data cache controller 102 (see FIG. 1) may transfer the cache requests to one or more of the cache banks CB#0 to CB#3. For example, a cache queue 105 of the data cache controller 102 may check a cache bank identifier included in the received cache request, and transfer the cache request to the cache bank corresponding to the cache band identifier.

The cache queue 105 may prioritize the received cache requests, and may determine the order of transferring the cache requests based on the priority. For example, in a case in which the processing element PE#0 and the processing element PE#1 simultaneously attempt to access the cache bank CB#0, the cache queue 105 may give the highest priority to one of the cache requests from the processing elements PE#0 and PE#1. The criteria for prioritization may vary according to the purpose of use and applications. In this example, it is assumed that a cache request of the processing element PE#0 is assigned a highest priority according to the identifier of the processing element. In such a case, the cache queue 105 may first transfer the cache request of the processing element PE#0 to the cache bank CB#0, and queue the cache request of the processing element PE#1.

The cache requests transferred to the respective cache banks CB#0 to CB#3 may result in a cache hit or a cache miss. The data cache controller 102 may process the cache hit or the cache miss independently in each cache bank. As an example, it is assumed that the processing element PE#0 requests a read of data from the cache bank CB#0, and the processing element PE#3 requests a read of data from the cache bank CB#3. If the cache requests are both cache hits, a reorder buffer 106 of the data cache controller 102 may transfer corresponding data from the cache bank CB#0 to the physical element PE#0 and corresponding data from the cache bank CB#3 to the physical element PE#3 individually. In addition, if a cache hit occurs in the cache bank CB#0 and a cache miss occurs in the cache bank CB#3, the reorder buffer 106 of the data cache controller 102 may transfer corresponding data from the cache bank CB#0 to the physical element PE#0, and a cache miss processing unit 107 of the data cache controller 102 may read a data set corresponding to a portion on which the cache miss occurs from the external memory 103, and may write the data set to the data cache 101. Furthermore, if cache misses occur in both cache banks CB#0 and CB#3, the cache miss processing unit 107 of the data cache controller 102 may prioritize the cache requests, and process the cache misses sequentially based on the priority. In more detail, the cache miss processing unit 107 may, after prioritizing the cache requests, read a data set from the external memory 103 that corresponds to the higher priority cache miss first, and write that data set to the data cache 101, and then proceed to read a data set from the external memory 103 that corresponds to the lower priority cache miss, and write that data set to the data cache 101. Alternatively, the cache miss processing unit 107 may read both corresponding data sets from the external memory 103 according to the established priority, and then write both data sets to the data cache 101 according to the established priority.

According to another example, the cache miss processing unit 107 may read the data set from the external memory 103 and write the data set to two or more of the cache banks CB#0 to CB#3 of the data cache 101 in an interleaved manner so as to allow two or more of the respective processing elements PE#0 to PE#3 to simultaneously access the same cache line. In addition, the cache miss processing unit 107 may directly access the external memory 103 through a bus 108.

In another example, the data cache controller 102 may transfer a cache request to a cache bank and temporarily store the cache request until receiving a signal that verifies the validity of data from the cache bank. Additionally, the data cache controller 102 may temporarily store data to be transmitted to the processing core 104 in accordance with latency that may be predefined according to the architecture of the processing core 104.

As described above, in an example in which the data cache 101 is divided into a number of cache banks CB#0 to CB#3 and the data cache controller 102 processes the cache requests to the cache banks CB#0 to CB#3 individually, the occurrence of the cache miss may be processed by accessing the external memory 103 and filling the data cache with the data set in an interleaved manner. Consequently, a plurality or all of the processing elements PE#0 to PE#3 may be enabled to simultaneously access the data cache 101.

Figure 2:
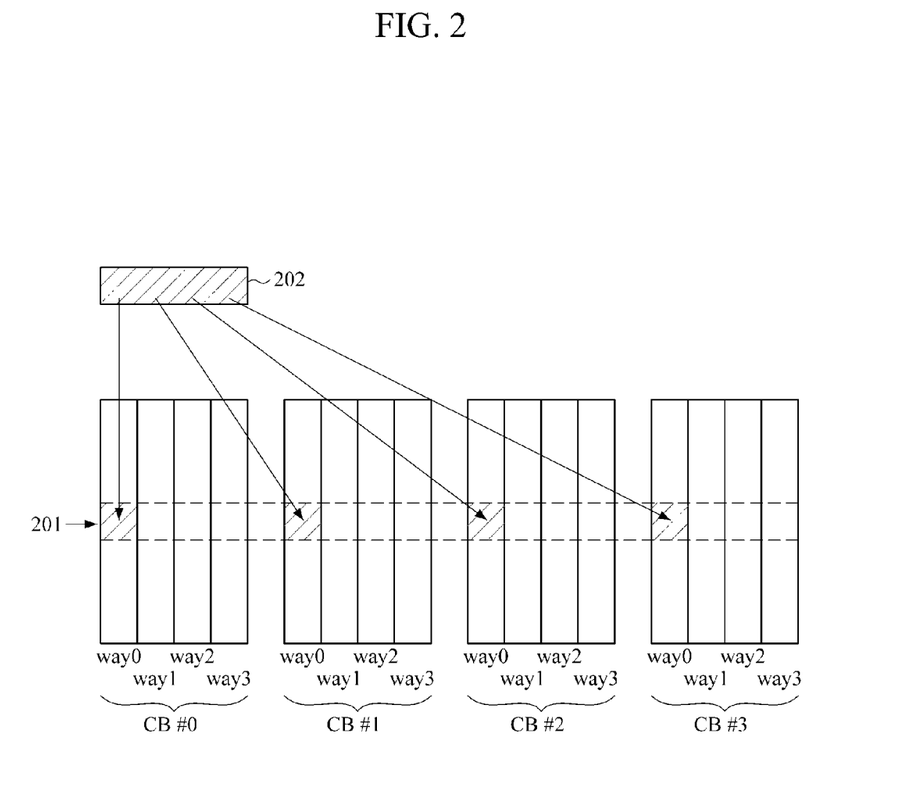
FIG. 2 is a diagram illustrating an example of an interleaved cache line.

FIG. 2 illustrates an example of a cache line. Referring to the example illustrated in FIG. 2, the cache banks CB#0 to CB#3 (see FIG. 1) may share the cache line 201. The cache line 201 may be a portion which is filled with the data read from an external memory in response to a cache miss occurring, that is, a portion in which a cache fill is performed.

In an example in which a cache miss occurs in the data cache 101, a data set 202 may be read from the external memory 103 (see FIG. 1). The data set 202 may include data corresponding to a cache request which has resulted in the cache miss. The size of the cache line 201 and/or the size of the data set 202 may vary according to the purpose of use and is applications.

The read data set 202 may be written to two or more of each of the cache banks CB#0 to CB#3 in an interleaved manner. In other words, the read data set 202 may be written to all cache banks CB#0 to CB#3 in a distributed manner when filling the cache line 201. For example, if the data cache 101 is a 4-way set associative cache, the read data set 202 may be written to a particular way of each of the cache banks CB#0 to CB#3 according to replacement policies of the cache.

In an example in which the cache-line fill is performed, a cache hit may occur, and thus relevant data is able to be provided to the processing element that has issued the request. As such, since the cache-line fill is performed in an interleaved manner, the processing speed of pieces of data having spatial locality is able to increase, and a number of processing elements PE#0 to PE#3 are allowed to simultaneously access the same cache line.

Figure 3A:
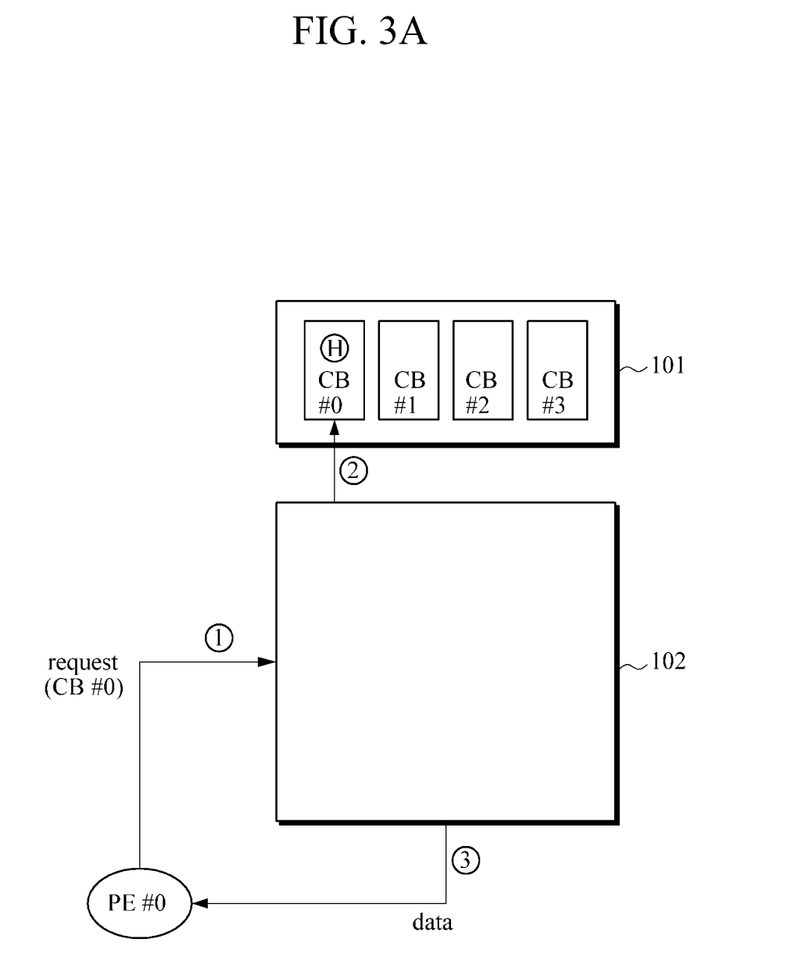
FIG. 3A is a diagram illustrating an example of a multiport data cache apparatus in which one cache request is present and one cache hit occurs.

FIG. 3A illustrates an example of a multiport data cache apparatus in which one cache request is present and one cache hit occurs. Referring to the example illustrated in FIG. 3A, the data cache controller 102 may receive a cache request for a cache bank CB#0 from a processing element PE#0 (①). The data cache controller 102 may transfer the received cache request to the cache bank CB#0 in a data cache 101 with reference to a cache bank ID (②). In this example, since a cache hit occurs in the cache bank CB#0 to which the cache request is transferred, the data cache controller 102 may read out data corresponding to the occurring cache hit, and may transmit the data to the processing element PE#0 (③).

Figure 3B:
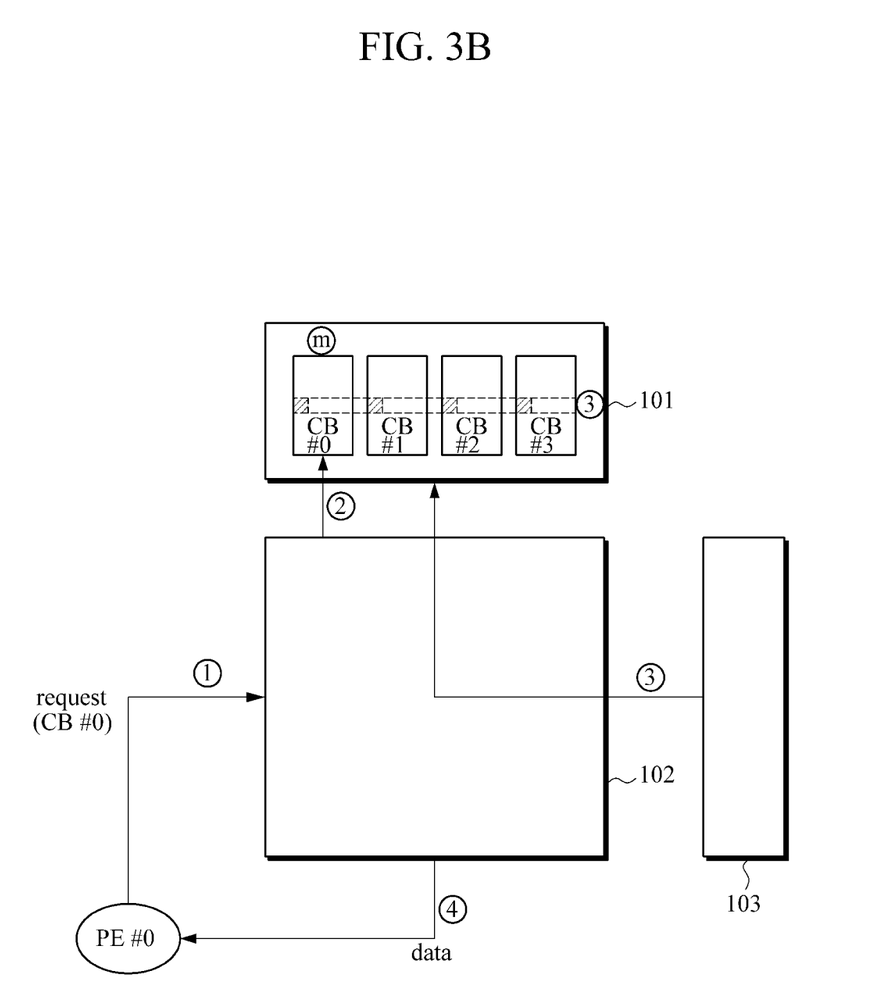
FIG. 3B is a diagram illustrating an example of the multiport data cache apparatus in which one cache request is present and one cache miss occurs.

FIG. 3B illustrates another example of the multiport data cache apparatus in which one cache request is present and one cache miss occurs. Referring to FIG. 3B, the data cache controller 102 may receive a cache request for a cache bank CB#0 from a processing element PE#0 (①). The data cache controller may transfer the received cache request to the cache bank CB#0 of the data cache 101 with reference to a cache bank ID (②). In this example, since a cache miss occurs in the cache bank CB#0 that has received the cache request, the data cache controller 102 may read data from the external memory 103 and write the read data to the data cache 101 in an interleaved manner (③). For example, the data cache controller 102 may access the external memory 103 through a separate bus, read data corresponding to the cache request, and which was not able to be read from the portion in which the cache miss has occurred, and write data to two or more of the cache banks CB#0 to CB#3 in a distributed manner. In response to the cache line being filled, a cache hit occurs, and consequently the data cache controller 102 may transmit data corresponding to the occurring cache hit to the processing element PE#0 (④).

Figure 3C:
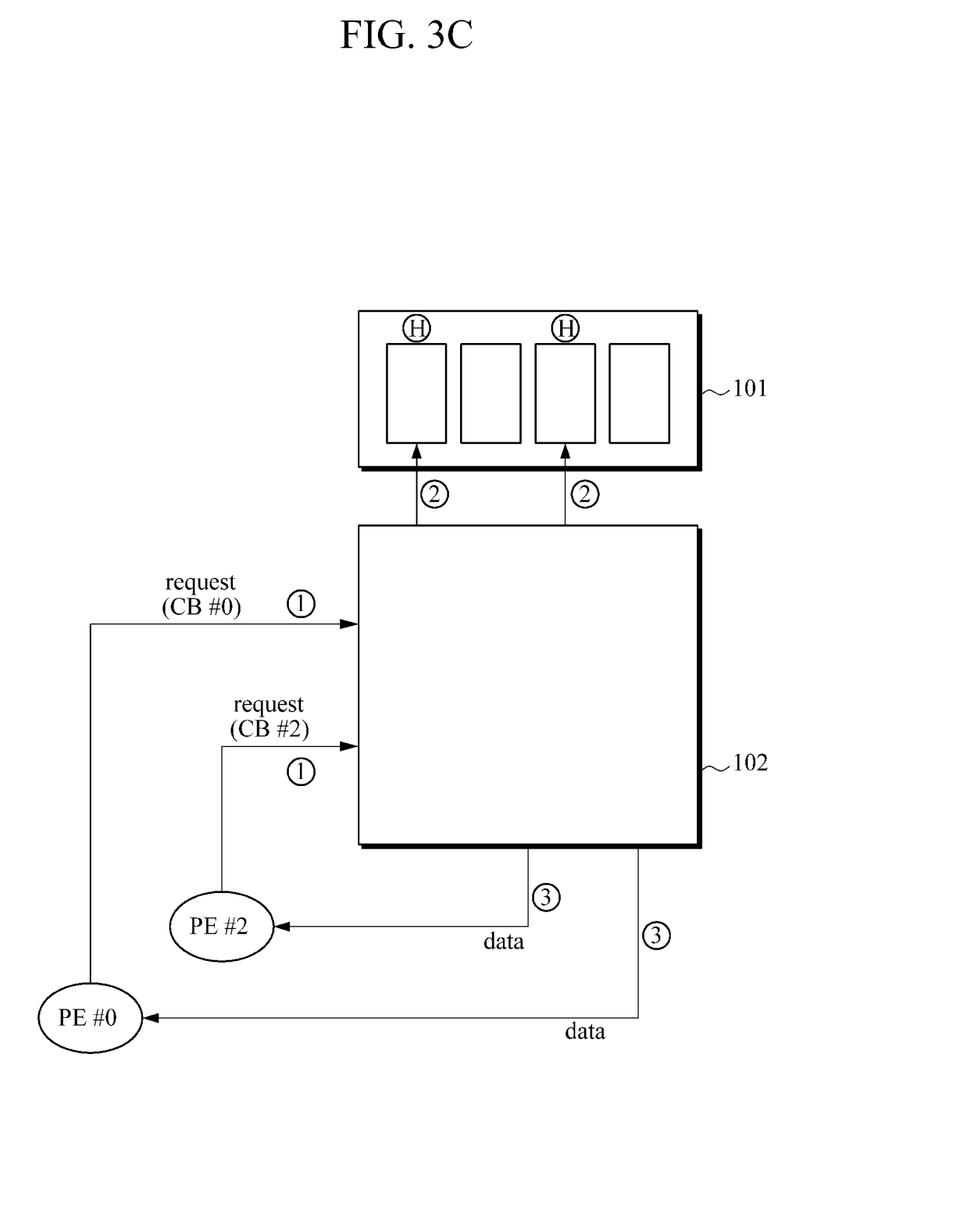
FIG. 3C is a diagram illustrating an example of the multiport data cache apparatus in which two cache requests are present and cache hits occur for both cache requests.

FIG. 3C illustrates another example of the multiport data cache apparatus in which two cache requests are present and cache hits occur for both cache requests. Referring to the example illustrated in FIG. 3C, the data cache controller 102 may receive a cache request for a cache bank CB#0 from a processing element PE#0, and may receive a cache request for a cache bank CB#2 from a processing element PE#2 (①). The data cache controller 102 may transfer the cache request received from the processing element PE#0 to the cache bank CB#0 of the data cache 101 and transfer the cache request received from the processing element PE#2 to the cache bank CB#2 with reference to cache bank IDs (②). In addition, since cache hits occur in both the cache bank CB#0 and the cache bank CB#2, the data cache controller 102 may read data on which the cache hits occur and transmit the read data to the respective processing elements PE#0 and PE#2 (③).

Figure 3D:
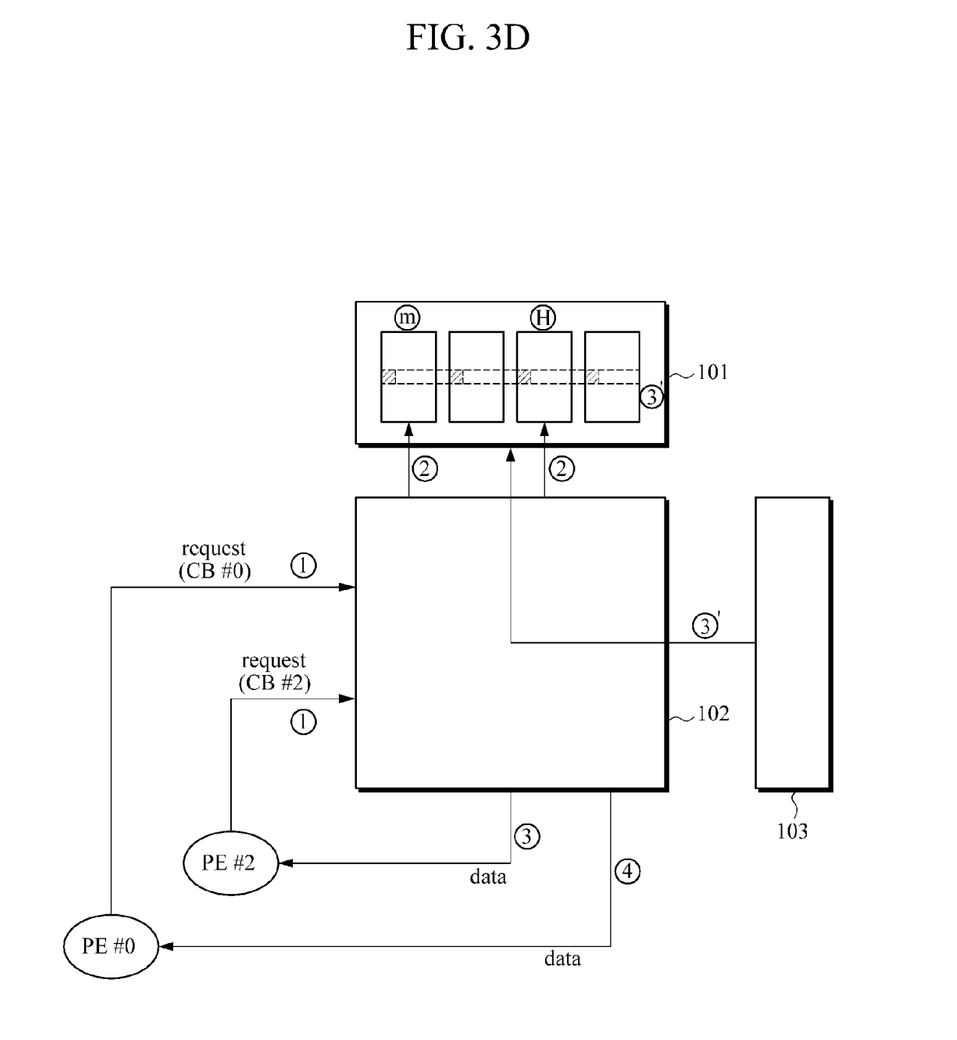
FIG. 3D is a diagram illustrating an example of the multiport data cache apparatus in which two cache requests are present, a cache miss occurs for one cache request and a cache hit occurs for another cache request.

FIG. 3D illustrates an example of the multiport data cache apparatus in which two cache requests are present, a cache miss occurs for one cache request, and a cache hit occurs for another cache request. Referring to the example illustrated in FIG. 3D, the data cache is controller 102 may receive a cache request for the cache bank CB#0 from the processing element PE#0, and may receive a cache request for the cache bank CB#2 from the processing element PE#2 (①). The data cache controller 102 may transfer the cache request received from the processing element PE#0 to the cache bank CB#0 of the data cache 101 and the cache request received from the processing element PE#2 to the cache bank CB#2 with reference to cache bank IDs (②). In this example, a cache miss occurs in the cache bank CB#0 and a cache hit occurs in the cache bank CB#2. The cache miss may stall the data cache controller 102 and data on which the cache hit has occurred may be read out from the cache and stored in the cache controller 102. According to the cache miss, the cache controller 102 may access the external memory 103 and fill the cache line in an interleaved manner (③'). Since the cache line is filled, a cache hit occurs, and the data cache controller 102 is able to transfer read data from the cache bank CB#2 on which the cache hit has occurred to the processing element PE#2 (③), and at the same time read data from the cache bank CB#0 on which a cache hit occurs after processing the cache miss and transmit the read data to the processing element PE#0 (④).

Figure 3E:
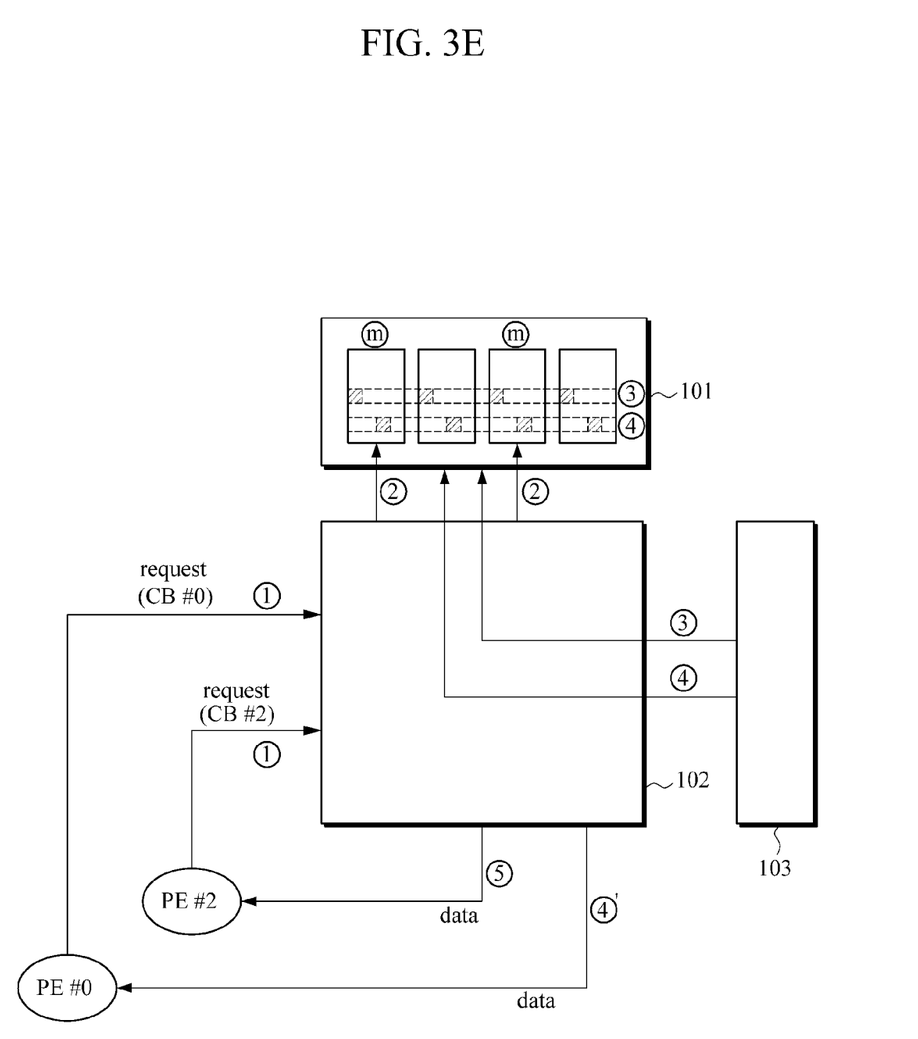
FIG. 3E is a diagram illustrating an example of the multiport data cache apparatus in which two cache requests are present and cache misses occur for both the cache requests.

FIG. 3E illustrates an example of the multiport data cache apparatus in which two cache requests are present and cache misses occur for both the cache requests. Referring to the example illustrated in FIG. 3E, the data cache controller 102 may receive a cache request for the cache bank CB#0 from the processing element PE#0, and may receive a cache request for the cache bank CB#2 from the processing element PE#2 (①). The data cache controller 102 may transfer the cache request received from the processing element PE#0 and the cache request received from the processing element PE#2 to the respective cache banks CB#0 and CB#2 of the data cache 101 (②). In this example, the cache misses occur in both the cache banks CB#0 and CB#2. In response to the cache misses occurring in both the cache banks CB#0 and CB#2, the data cache controller 102 may prioritize the cache requests. The prioritization may be performed according to the processing element identifiers, but the prioritization is not limited thereto. For example, the data cache controller 102 may give a higher priority to the cache request from the processing element PE#0 than the cache request from the processing element PE#2. The data cache controller 102 may first process the cache request from the processing unit PE#0 having a relatively higher priority. That is, data corresponding to a cache request and not able to be read from the portion of the cache bank CB#0 on which the cache miss has occurred may be read from the external memory 103 and written to the data cache 101 in an interleaved manner (③). While the cache request from the processing element PE#0 is being processed, the other cache request having a relatively lower priority may be queued. Once the cache miss in the cache bank CB#0 is processed, the cache miss queued in the cache bank CB#2 may be processed (④), and data that has previously filled the cache line may be simultaneously stored in the data cache controller 102. Data resulting from processing of the cache miss in the cache bank CB#2 may be transmitted to the processing element PE#2 (⑤), and at the same time the data of the cache bank CB#0 which is stored in the data cache controller 102 may be transmitted to the processing element PE#0 (④').

Figure 3F:
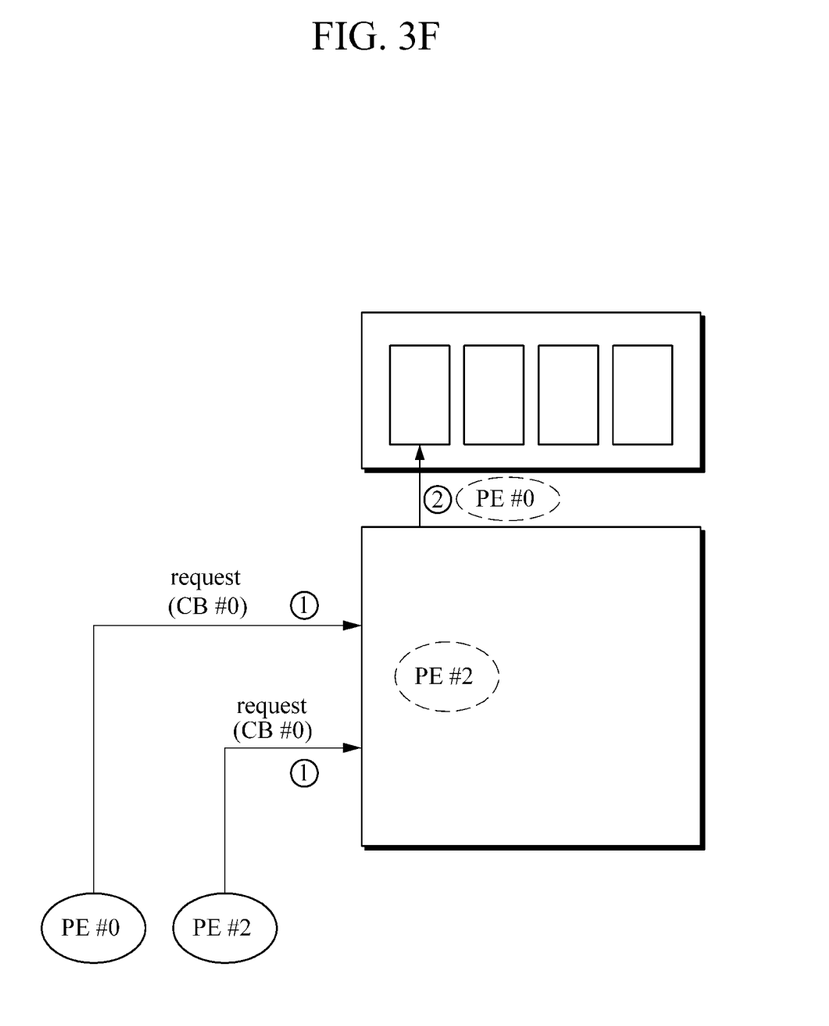
FIG. 3F is a diagram illustrating an example of the multiport data cache apparatus in which two cache requests are present and all cache requests have the same cache bank identifier.

FIG. 3F illustrates an example of the multiport data cache apparatus in which two cache requests are present and all cache requests have the same cache bank identifier. Referring to the example illustrated in FIG. 3F, the data cache controller 102 may receive cache requests from the respective processing elements PE#0 and PE#2, and transfer the received cache requests to one of cache banks of the data cache 101 with reference to a cache bank ID (①). In this example, all cache requests request access to the cache bank CB#0, and thus the data cache controller 102 may prioritize the cache requests, and may process the cache request according to the assigned priority. For example, a cache request from the processing element PE#0 may be assigned the highest priority, and may be transferred to the cache bank CB#0 first (②). A is cache request from the processing element PE#2 having a lower priority may be queued, and transferred to the cash bank CB#0 when the cache request from the processing element PE#0 has been processed. A method of prioritization may vary according to the purpose of use and applications, and the priority may be assigned at random.

Figure 4:
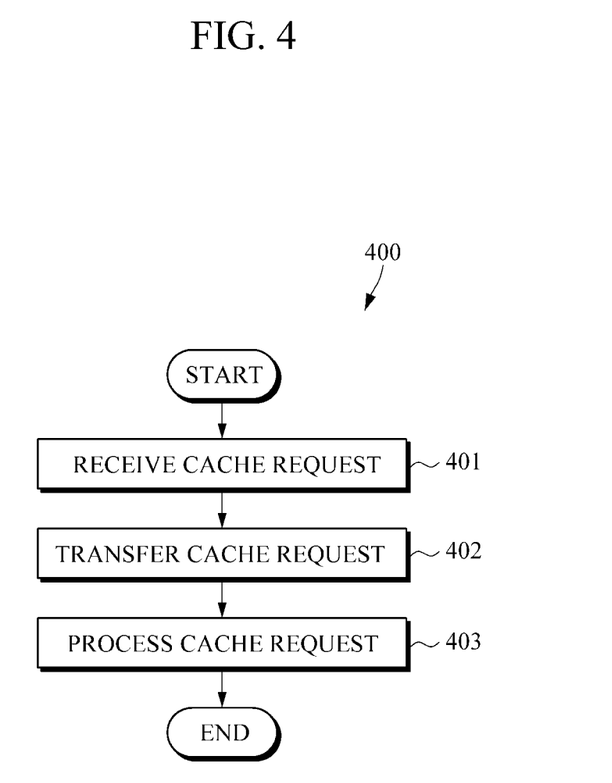
FIG. 4 is a flowchart illustrating an example of a method of controlling a multiport data cache.

FIG. 4 is a flowchart illustrating an example of a method of controlling a multiport data cache. The method will be described with reference to FIGS. 1 and 4.

The multiport data cache apparatus may receive a cache request including a cache bank identifier of a cache bank (401). For example, the data cache controller 102 may receive a cache request containing a cache bank identifier from each of the processing elements.

The multiport data cache apparatus may transfer the received cache request to the cache bank corresponding to the included cache bank identifier (402). For example, the cache queue 105 of the data cache controller 102 may check the cache bank identifier included in the received cache request and transfer the cache request to the cache bank corresponding to the cache bank identifier. In addition, if two or more cache requests having the same cache bank identifier are received, the cache queue 105 may prioritize the cache requests, and determine the order of transferring the cache requests according to the priority.

The multiport data cache apparatus may process the cache requests independently in the cache banks (403). For example, the reorder buffer 106 and the cache miss processing unit 107 of the data cache controller 102 may process, respectively, a cache hit and a cache miss. The processing may be performed in various ways according to the number of cache requests and the occurrence of the cache hit or the cache miss resulting from the cache request, and the representative examples of the processing may be as described above with reference with FIGS. 3A to 3F.

Figure 5:
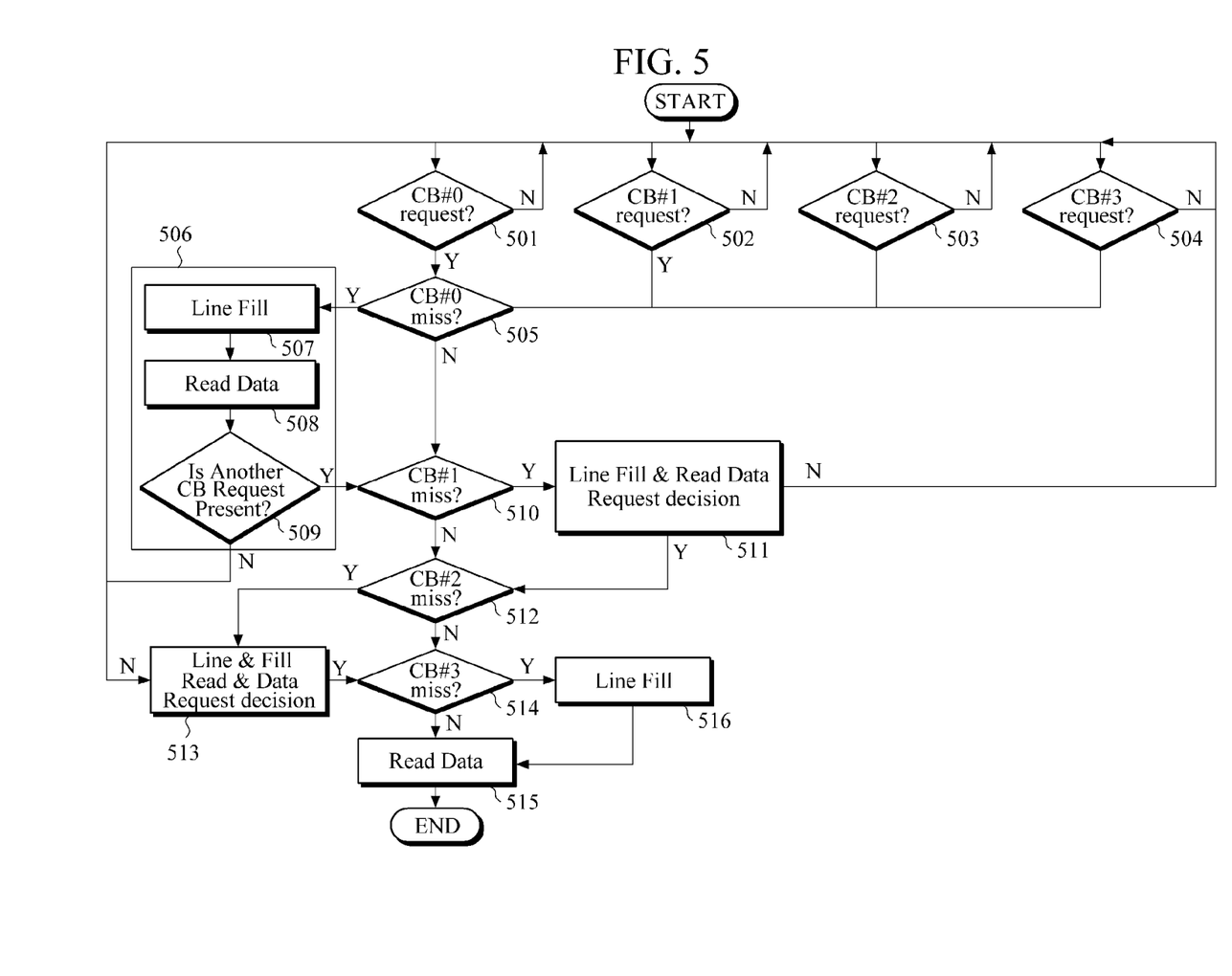
FIG. 5 is a flowchart illustrating an example of a method of processing a cache miss.

FIG. 5 is a flowchart illustrating an example of a method of processing a cache miss. This example describes the method of processing cache misses in the order of the cache banks CB#0, CB#1, CB#2, and CB#3 with reference to FIGS. 1 and 5.

The data cache controller 102 may determine whether a cache request is present for each cache bank CB#0 to CB#3 (501, 502, 503, and 504). The cache bank may include a 32-bit address as illustrated in the example of FIG. 6.

If a number of processing elements issue a cache request, the data cache controller 102 may first determine whether a cache miss occurs in the cache bank CB#0 (505). If the cache miss occurs in the cache bank CB#0, the data cache controller 102 may fill a cache line of the cache bank CB#0 in an interleaved manner (506). More specifically, the data cache controller 102 may read data from the external memory 103 and fill the cache line with the read data in an interleaved manner (507), read out data from the cache line (508) and determine whether or not a cache request for another cache bank is present (509).

If there is a cache request for another cache bank, the data cache controller 102 may determine whether or not a cache miss occurs in the cache bank CB#1 (510). If the cache miss occurs, the same operation as in operation 506 may be performed for the cache bank CB#1 (511).

Furthermore, the data cache controller 102 may determine whether or not a cache miss occurs in the cache bank CB#2 (512). If the cache miss occurs, the same operation as in operation 506 may be performed for the cache bank CB#2 (513), and otherwise it may be determined whether or not a cache miss occurs in the cache bank CB#3 (514).

If a cache hit occurs in the cache bank CB#3, data on which the cache hit occurs may be read out from the cache bank CB#3 (515), and if a cache miss occurs in the cache bank CB#3, a corresponding cache line may be filled with data read from the external memory (516) and data may be read out from the filled cache line (515).

As such, according to the above examples, the data cache controller 102 may access the external memory 103 to fill a cache line in response to a cache miss occurring, and the cache line may be formed across a plurality of cache banks in an interleaved manner. Thus, a plurality of cache requests are enabled to simultaneously access one cache line.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other is implementations are within the scope of the following claims.

What is claimed is:

1. A multiport data cache apparatus comprising:
   a plurality of cache banks configured to share a cache line; and
   a data cache controller configured to receive cache requests for the cache banks, each of the cache requests including a cache bank identifier, transfer the received cache requests to the respective cache banks according to the cache bank identifiers, and process the cache requests independently from one another, wherein
   the data cache controller is further configured to read a data set corresponding to a cache request, which results in a cache miss, from an external memory and write each one of different portions of the data set read from the external memory to a different one of the cache banks in an interleaved manner.

2. The multiport data cache apparatus of claim 1, wherein the data cache controller is further configured to receive the cache requests from a plurality of processing elements, and to provide data from cache banks upon which a cache hit occurs to the processing elements.

3. The multiport data cache apparatus of claim 1, further comprising:
   a plurality of processing elements configured to simultaneously access the same cache line.

4. The multiport data cache apparatus of claim 1, wherein the data cache controller is further configured to prioritize the cache requests, and sequentially process the cache requests according to the priority, in response to at least two of the cache requests including the same cache bank identifier.

5. The multiport data cache apparatus of claim 4, wherein the data cache controller is further configured to transfer one of the cache requests having the same cache bank identifier to the cache bank according to the priority, and queue remaining cache requests until the transferred cache request is processed.

6. The multiport data cache apparatus of claim 1, wherein the data cache controller is further configured to receive at least two cache requests having different cache bank identifiers, and to prioritize the cache requests, and sequentially process the cache requests according to the priority, in response to cache misses occurring in more than one of the cache banks identified in the at least two cache requests.

7. The multiport data cache apparatus of claim 6, wherein the data cache controller is further configured to queue remaining received cache requests until at least one of the at least two cache requests is processed according to the priority.

8. A multiport data cache control method comprising:
   receiving cache requests for individual cache banks, each of the cache requests including a cache bank identifier;
   transferring the received cache requests to the respective cache banks according to the cache bank identifiers; and
   processing the cache requests for the respective cache banks independently from one another, wherein
   the processing of the cache requests comprises reading a data set corresponding to a cache request, which results in a cache miss, from an external memory, and writing each one of different portions of the data set read from the external memory to a different one of the cache banks in an interleaved manner.

9. The multiport data cache control method of claim 8, wherein the cache requests are received from a processing element and the processing of the cache requests comprises providing data from cache banks upon which a cache hit occurs to the processing element.

10. The multiport data cache control method of claim 8, wherein the cache banks share a cache line.

11. The multiport data cache control method of claim 8, wherein the processing of the cache requests comprises prioritizing the cache requests, and sequentially processing the cache requests according to the priority, in response to cache misses occurring in more than one of the cache banks identified in at least two cache requests.

12. The multiport data cache control method of claim 11, wherein the processing of the cache requests comprises queuing remaining received cache requests until at least one of the at least two cache requests is processed according to the priority.

13. The multiport data cache control method of claim 8, wherein the transferring of the cache requests comprises prioritizing the received cache requests, and sequentially transferring the cache requests according to the priority, in response to at least two of the cache requests including the same cache bank identifier.

14. The multiport data cache control method of claim 13, wherein the transferring of the cache requests comprises transferring one of the cache requests having the same cache bank identifier according to the priority, and queuing remaining cache requests until the transferred cache request is processed.

* * * * *